I. L. HOFFER.
CALCULATOR.
APPLICATION FILED OCT. 7, 1919.
1,365,997.
Patented Jan. 18, 1921.
2 SHEETS—SHEET 1.
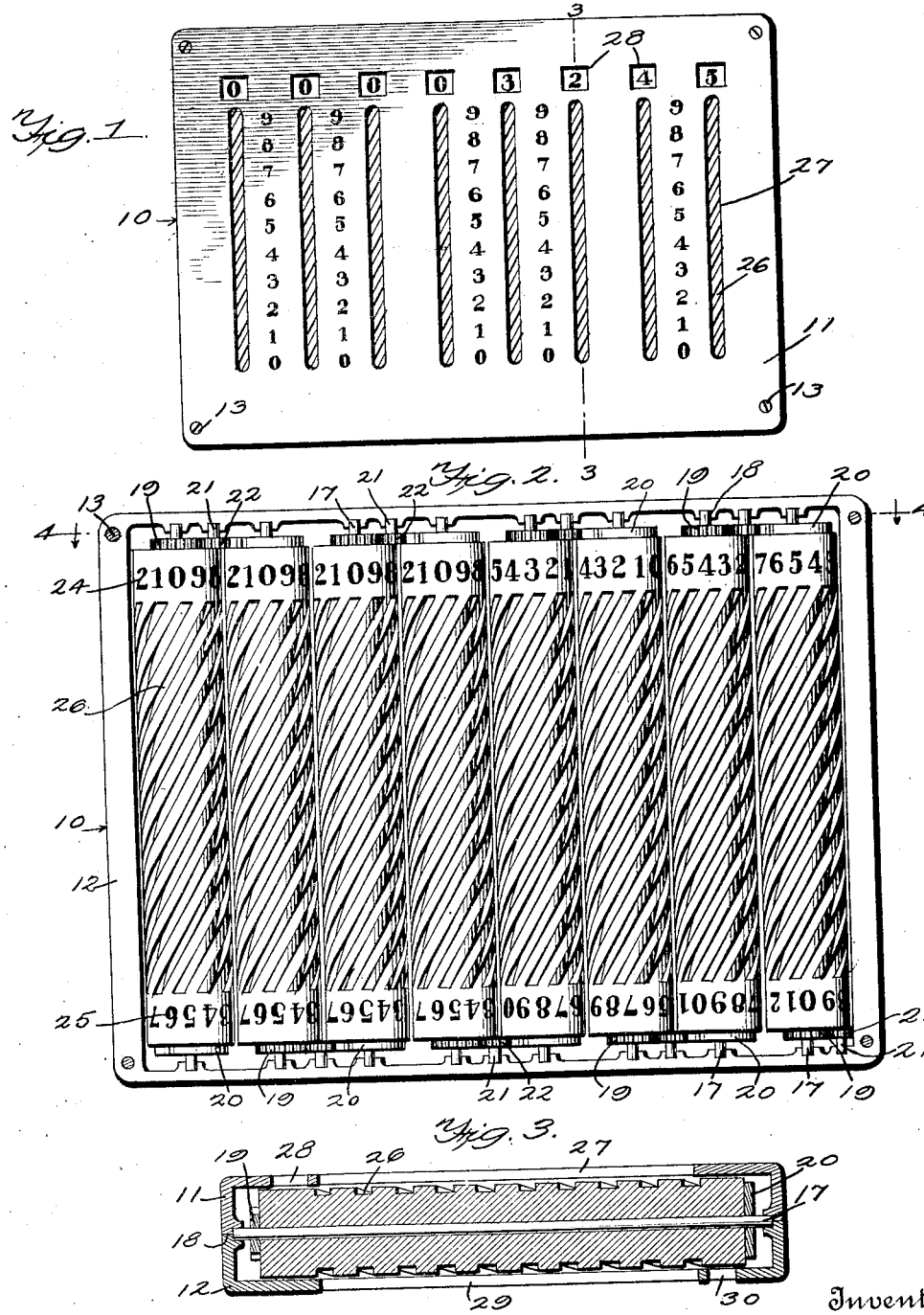
Inventor
Ivan L. Hoffer,
By
Attorney

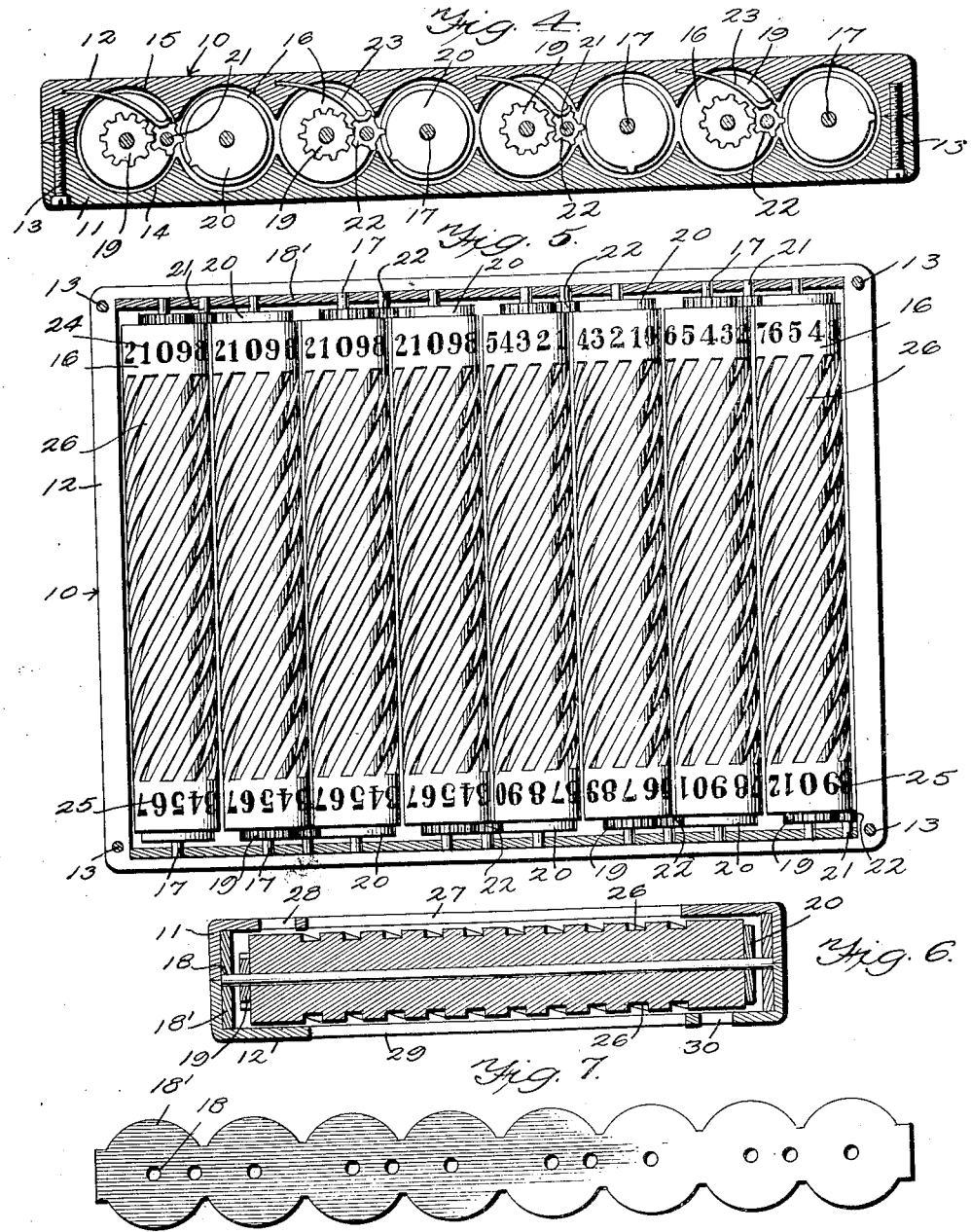

UNITED STATES PATENT OFFICE.

IVAN L. HOFFER, OF MARCUS, WASHINGTON.

CALCULATOR.

1,365,997. Specification of Letters Patent. Patented Jan. 18, 1921.

Application filed October 7, 1919. Serial No. 329,038.

*To all whom it may concern:*

Be it known that I, IVAN L. HOFFER, a citizen of the United States, residing at Marcus, in the county of Stevens and State of Washington, have invented certain new and useful Improvements in Calculators, of which the following is a specification.

This invention relates to new and useful improvements in calculators, and has for its object the provision of a calculator simple in construction and the parts of which may be readily restored when destroyed by long usage.

A further object is to provide a device of the above mentioned character of the type commonly known as vest-pocket calculator.

A further object is the provision of a device of this character which may be used not only for addition and subtraction, but also for multiplication and division.

Other objects and advantages will be apparent during the course of the following discussion.

In the accompanying drawings, wherein for the purpose of illustration is shown a preferred form of my device and wherein like numerals designate like parts throughout:

Figure 1 is a front elevation of my device;

Fig. 2 is a similar view, one-half of the casing having been removed;

Fig. 3 is a section on the line 3—3 of Fig. 1;

Fig. 4 is an enlarged section on the line 4—4 of Fig. 2.

Fig. 5 is a view similar to that shown in Fig. 2 illustrating the use of bearing plates for the rotatable shafts, and Fig. 6 is a section similar to that shown in Fig. 3, illustrating the use of bearing plates, Fig. 7 is a plan view of a bearing plate detached.

Referring now more particularly to the drawings, the numeral 10 indicates the casing as a whole.

The casing 10 comprises complementary plates 11 and 12 secured together by means of screws 13 or the like. The sections 11 and 12 are provided with complementary apertures 14 and 15 forming approximately circular openings in which are disposed rotatable cylindrical members 16.

These members are secured to, or rotatable upon shafts 17 mounted in journals 18. The journals 18 are split, one-half being formed upon each of the sections 11 and 12. In the form shown in Figs. 5 and 6 have illustrated a different method of mounting the shafts 17. In this form thin bearing plates 18' are provided and the journals 18 are formed therein.

Secured upon one end of each of the rotatable members is a gear 19 shown in the present instance as being provided with ten teeth. Secured to the opposite end of the rotatable member is a mutilated gear 20 having a single tooth. In some forms of this calculator as, for example, a form adapted for compiling sums in English currency, the mutilated gear 20 may, on certain of the cylindrical members have more than one tooth. The ends of the cylinders are alternated, that is to say, the end of the first cylinder to the right which is supplied with the mutilated gear 20 is adjacent to the end of the cylinder of the second member which is provided with the gear 19. Mounted in the ends of the casing or in the bearing plates 18' are stub shafts 21 provided with a pinion 22 meshing with the gears 19. Springs 23 are provided which bear against the pinions 22 preventing too free rotation thereof. These pinions also insure correct alinement of the indicia 24 with the window.

The rotatable members 16 are provided upon one end thereof with an annular set of indicia 24, and upon the opposite end the second annular set of indicia 25 reading in reverse order to the indicia of the set 24. The body of the rotatable members is provided with spiral grooves 26.

Plate 11 which forms the side of the device hereinafter to be known as the addition side thereof, is provided with vertical slots 27 and small windows 28 placed immediately above each of the vertical slots 27. The plate 12 or subtraction side of the device is provided with similar slots 29 having arranged thereabove small windows 30. The slots 27 and 29 allow access to the spiral grooves formed in the rotatable members 16 and the windows 28 and 30 are alined with the indicia arranged on the opposite ends of the rotatable members.

It will be noted by an inspection of the drawings that when the stylus is inserted in one of the doors of the addition side of the device and drawn downwardly, the rotatable member is rotated in the normal direction and the numbers appear in the corresponding window in their usual order. When, however, the stylus is inserted in one of the doors of the subtraction side and drawn downwardly, the rotatable member is reversely rotated and the numbers appear in the window corresponding thereto in the reverse of normal order.

The operation of my device is as follows: When it is desired to perform an operation in addition the device is cleared. This is done by subtracting the number appearing in the windows. In other words, the rotatable members 16 are shifted until zero appears in each of the windows. Then presuming that it is desired to add numbers 1648 and 1597. Beginning at the right hand slot the operator inserts the point of a pencil or stylus into the slot 27 directly opposite the figure 8 in the vertical row of indicia adjacent to slot drawing the pencil or stylus downwardly until it engages the bottom of the slot. As the point of the pencil or stylus engages in the spiral groove formed in the rotatable member, the member is shifted eight-tenths of its circumference and the number 8 accordingly appears in the first window to the right. In the next slot to the left the stylus is inserted in the number 4 and drawn down, and the number 4 appears in the window above the slot, in the next slot the stylus is inserted at the number 6 and drawn down and in the next at the number 1. In the windows now appears the number 1648. Returning to the right hand slot the operator inserts the stylus at point 7 and draws the stylus down, as the sum of 8 and 7 is greater than 10, the single tooth of the mutilated gear 20 engages the pinion 22 shifting the gear 19, of the next cylinder to the left, one tooth. The number in the windows now appearing 1655. At the next slot to the left insert the stylus at the number 9 and draw the stylus down. As the sum of 9 and 5 is more than 10 the operation above is again repeated and the number now appears in the windows 1745. At the next slot to the left the operator inserts the stylus at the number 5, draws the stylus down, and as the sum of these numbers is again more than 10 the carrying forward operation is again repeated, and the number 2245 appears in the windows. The operation is completed by inserting the stylus at the fourth window from the right at the number 1 and drawing the stylus down, giving the complete sum 3245. Because of the peculiar arrangement of the indicia the same answer appears in the windows upon both sides of the casing. To subtract, the minuend is first placed in the windows. The device is then turned over to bring the subtraction side thereof into use and the subtrahend placed in the machine by placing the stylus at the proper numbers in the proper slots and drawing the stylus down. The face of the section 12 is provided with figures from 0 to 9, arranged beside the slots 29 similarly to the figures arranged beside the slots 27 on the face 11 and shown in Fig. 1 of the drawings. The figures on the face 12 read in reverse order from the top of the slots 29, or the end toward the windows 30. The face is thus the same in appearance as the face of the section 11, but when a given number is carried down in the slots, the rollers are operated in the reverse direction. As set forth above, this causes rotation of the rotatable members in the reverse direction and the number is subtracted from that appearing in the windows.

From the foregoing it will be seen that I have evolved a machine which is capable of any of the simpler operations and which at the same time is not complicated in construction or difficult of operation.

As many changes in the size, shape and arrangement of parts could be made without in any manner departing from the spirit of the invention, I do not limit myself to the structure herein shown and described but may make any such changes without departing from the spirit of the invention or the scope of the subjoined claim.

Having thus described my invention, I claim:

In a computing device, a casing, a plurality of rotatable elongated members mounted in said casing, said casing being provided with a slot on each side thereof adjacent each rotatable member to permit rotation of said member in either direction, a series of consecutive numbers arranged adjacent of consecutive numbers arranged adjacent said slots, the numbers on opposite sides of the casing being arranged in reverse order, one end of each of said rotatable members being provided with a series of consecutive numbers corresponding to those adjacent the slots, said casing being provided in one face thereof with a series of windows each adapted to display one number of one of said series of numbers on the rotatable members, and means for turning each of said rotatable members one step when the preceding rotatable member has been rotated a predetermined number of steps.

In testimony whereof I affix my signature in presence of two witnesses.

IVAN L. HOFFER.

Witnesses:
J. F. LAVIGNE,
WM. B. CARTER.